Dec. 19, 1967    G. HIRSCHFELD ETAL    3,358,535
ARRANGEMENTS FOR CONTROLLING THE TOOL
SLIDE OF A TURNING MACHINE
Filed Feb. 17, 1967

Inventors
Günter HIRSCHFELD &
Herbert SCHNEIDER

By Melvin A. Crosley

United States Patent Office 3,358,535
Patented Dec. 19, 1967

3,358,535
ARRANGEMENTS FOR CONTROLLING THE TOOL SLIDE OF A TURNING MACHINE
Gunter Hirschfeld, Burscheid, and Herbert Schneider, Blecher, Germany, assignors to Goetzewerke Friedrich Goetze, A.-G., Burscheid, Dusseldorf, Germany
Filed Feb. 17, 1967, Ser. No. 616,978
Claims priority, application Germany, July 31, 1963, G 38,365
5 Claims. (Cl. 82—24)

ABSTRACT OF THE DISCLOSURE

The invention concerns a turning machine in which a tool slide performs a fairly large advance movement at high speed to working position and then a fairly slow short feed movement for a turning operation, and then retracts rapidly to starting position in which a spindle driving control element engages the tool slide and controls the speed of movement thereof during feed.

Cross-reference to a related application

This application is a continuation-in-part application of my copending application ser. No. 382,159, filed July 13, 1964.

Background of the invention

This invention relates to machine tools and is particularly concerned with an apparatus for controlling the movement of a tool carrying slide, such as the cross slide of a lathe. More particularly still, the invention relates to an apparatus for controlling the movement of a tool carrying slide so that the tool slide can move rapidly to and from the workpiece to be cut by a tool therein while the feed movement of the tool slide during an actual machining operation is controlled, preferably in accordance with the rotation of the main spindle of the machine.

In a machine tool such as an automatic lathe, the tool carrying slide, during rapid traverse and rapid retraction thereof must move at a velocity of from about twelve to fifteen meters per minute for economical operation of the machine tool. Further, within the short space of about $\frac{1}{10}$ mm. during the advancing travel of the tool slide, the tool slide must be switched over to a slow feeding movement for carrying out the cutting operation. Preferably, the feeding movement is under the control of the main spindle of the machine so that the feeding movement will be in conformity with the surface speed of the workpiece being turned. It will be apparent that it is important to adjust the limits of movement of the tool slide during which it is moving rapidly so that the machine tool operates at maximum efficiency.

The present invention is particularly concerned with with an apparatus of this nature and is more particularly an apparatus of this nature and is more particularly concerned with an apparatus wherein the rapid advance and retraction movement of the tool slide takes place under the action of a hydraulic medium while the slow feeding movement of the tool slide is controlled mechanically.

During the last-mentioned feed movement of the tool slide, the hydraulic medium provides the driving power for the tool slide while the mechanical devices connected to the tool slide effect a speed controlling or regulating influence thereon.

The apparatus includes adjustable stop screws and switch actuating screws and the like for rapid and accurate adjustment of the limits of movement of the tool slide and the point of shift over thereof.

In one modification of the present invention, the tool slide carries a resiliently biased roller engageable with a cam driven by the machine tool spindle and which spring biased roller controls a limit switch operable for controlling the connection of the aforementioned cam to the machine tool spindle and also for initiating retraction of the tool slide at the end of a feeding operation.

The aforementioned cam is spiral, such as a spiral of Archimedes and preferably has a pitch such that the cam does not tend to be driven by the roller when the two are in engagement. Still further, the cam preferably has a predetermined initial rest position to which it is returned after each cutting cycle so that the cam always starts from the same place and exact synchronization of all parts of the apparatus is easily accomplished.

The tool slide referred to above can also be provided with a transverse slide for advancing and retracting a tool toward a workpiece whereas the first-mentioned tool slide will then be effective for controlling the rate of movement of the tool along the workpiece after it is engaged therewith. The two slides are preferably interlocked to operate in a certain sequence.

Summary of the invention

With the foregoing in mind, it will be evident that the present invention has as a primary object a control system for controlling the rapid advance and rapid retraction and feed movement of the tool slide in a machine tool.

Another object of this control arrangement for controlling the tool slide of a machine tool for rapid advance and rapid retraction and said units utilizing a combination of hydraulic and mechanical actuating and control components.

A still further object of this invention is the provision of a combination of a hydraulic and mechanical control arrangement for controlling the tool slide means in a machine tool during rapid advance, rapid retraction, and feed movements thereof in which the limits of movement of the tool slide means and the point of shift over thereof from rapid advance to feed movement, and from feed movement to rapid retraction, can be easily and accurately adjusted.

Brief description of the drawings

These and other objects and advantages of this invention will become more apparent upon reference to the following specification taken in connection with the accompanying drawings, in which.

Description of the operation of the preferred embodiments

Figure 1:
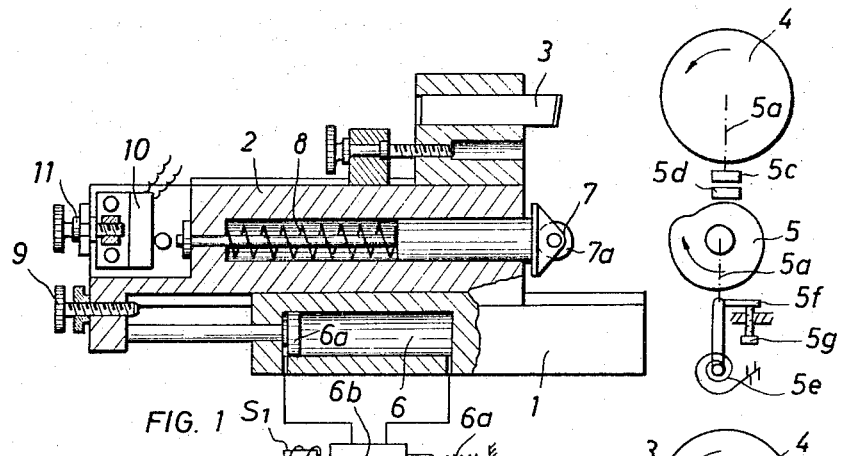
FIGURE 1 shows somewhat schematically one embodiment of the present invention with the tool slide shown in its fully retracted position.
Figure 2:
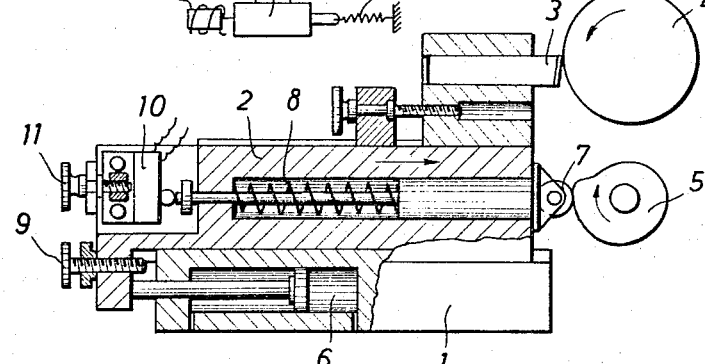
FIGURE 2 shows the arrangement of FIGURE 1, but with the tool slide in the position it occupies at the instant of shifting over from rapid advance to feed movement.
Figure 3:
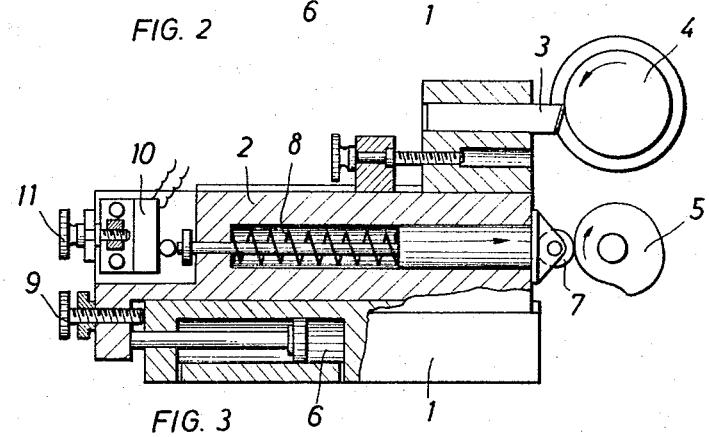
FIGURE 3 shows the embodiment of FIGURE 1, with the tool slide stopped at the end of the feed movement thereof and immediately prior to initiation of the rapid retracting movement thereof which will return the tool slide to its FIGURE 1 position.

Referring to the drawings somewhat more in detail, FIGURES 1 to 3 show a bed 1 having a tool slide 2 mounted thereon, a lathe cross slide for example. Base 1 is formed with or carries a cylinder 6 having therein a piston 6a having its rod connected to slide 2. Slide 2 carries a block 2a in which cutting tool 3 is fixed and with block 2a being adjustable on the tool slide as by adjusting screw means 2b. The tool 3 is operable for cutting a workpiece 4 mounted on the work axis of the machine tool and driven in rotation by a spindle mechanism 4a.

The movement of slide 2 toward and away from the work axis of the machine tool is accomplished by reversibly supplying fluid to the cylinder 6 from a reversing vale 6b. Valve 6b is biased by spring 6c in a direction to supply fluid to the right hand end of cylinder 6 which will cause slide 2 to move leftwardly or in its retracting direction. Energization of solenoid S1, however, will shift valve 6b to reverse the supply of fluid to cylinder 6, whereupon piston 6a will be thrust rightwardly and this will move slide 2 rightwardly or in the advancing direction.

Slide 2 carries a plunger 7 biased in the advancing direction of slide 2 by a spring 8. Plunger 7 has a roller 7a at its outer end adapted for engagement with spiral cam 5 during the advancing movement of slide 2 and immediately prior to the engagement of workpiece 4 by cutting tool 3. Cam 5, which can advantageously be formed as a spiral of Archidmedes, having a uniform rise from its low point to its high point, is preferably of such a pitch or inclination that roller 7a has no tendency to drive cam 5.

Cam 5 is mounted on a shaft 5a which is adapted for connection via normally open electrically operable clutch 5c with spindle 4a by way of an adjustable speed transmission 5d.

Shaft 5a is preferably biased by a spring 5e in a direction opposite to the direction in which it is driven by spindle 4a, said direction being indicated by the arrow on cam 5 so that upon disengagement of clutch 5c, spring 5e will return the cam to its starting position. This starting position is accurately determined by abutment 5f on shaft 5a which engages stationarily but adjustably mounted stop screw 5g when the cam is in its rest position.

Plnger 7 at its end opposite roller 7a is adapted for actuating engagement with a limit switch 10 when the plunger is pushed inwardly in slide 2 against the bias of spring 8 by engagement of cam 5 by roller 7a. Limit switch 10 is preferably mounted on a carrier adjustable by adjusting screw 11 in the direction of travel of the tool slide 2.

Slide 2 also carries an adjustable stop screw 9 which engages base or bed 1 when the slide 2 reaches its predetermined maximum advanced position.

Figure 4:
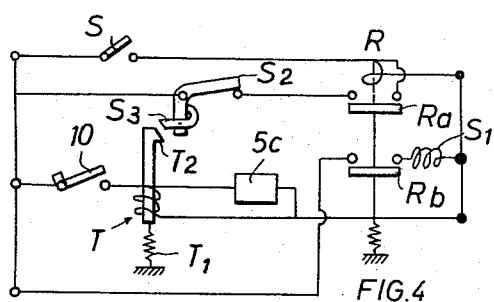
FIGURE 4 is a somewhat schematic representation of an electric control circuit for controlling the embodiment of FIGURES 1 to 3.

FIGURE 4 shows an electric control for the embodiment of FIGURES 1 through 3. In this figure, a start switch S is provided which when closed will energized a relay R that has a holding circuit through its blade Ra. A second blade Rb of the relay is in circuit with solenoid S1 of valve 6b.

The aforementioned limit switch 10, which is normally open, is in circuit with the actuating coil of an electric clutch 5c. This last-mentioned limit switch is also in circuit with the actuating coil of an electrically operated trip member T that is operable for opening a switch S2 in the holding circuit of relay R.

In operation, assuming the parts of the apparatus are in their FIGURE 1 position, switch S is closed thereby energizing solenoid S1 to cause shifting of valve 6b, thereby initiating rapid rightward movement of tool slide 2 toward the work axis of the machine tool.

Before tool 3 engages workpiece 4, roller 7a will engage cam 5 and this will push plunger 7 into slide 2 against the bias of spring 8 and bring about closing of switch 10.

The aforementioned closing of switch S resulted in energization of relay R which closed its holding blade Ra and also closed its blade Rb, which later effected energization of valve solenoid S1. Upon closing of switch 10, the actuating coil of clutch 5c is energized and this will effect driving connection of spindle 4a with shaft 5a of cam 5 so that cam 5 will commence to turn in the clockwise direction as indicated by the arrow thereon, thus permitting tool slide 2 to move toward the work axis of the machine at a controlled rate.

After a predetermined amount of feed movement of slide 2, stop screw 9 will abut bed or base 1 and halt tool slide 2 while cam 5 will continue to rotate. This further rotation of cam 5 will permit plunger 7 to be returned to the influence of spring 8 and switch 10 will be permitted to open. Opening of switch 10 will de-energize the actuating solenoid of electric clutch 5c and thus disconnect shaft 5a of cam 5 from spindle 4a whereupon cam 5 and its shaft 5a will be returned by spring 5e to the starting position of the cam which is determined by stop elements 5f and 5g.

Opening of switch 10 will also de-energize trip mechanism T, and during downward movement of this trip mechanism under the influence of its biasing spring T1, the offset portion T2 of the trip mehanism which, at this time, is positioned above the pivoted finger S3 of switch S2, will engage the said finger and open switch S2 thereby interrupting the holding circuit of relay R to drop the relay open. Opening of the relay opens its blades Ra and Rb and solenoid S1 is thereby de-energized so that spring 6c will shift valve 6b into position to bring about rapid retraction of slide 2 to its FIGURE 1 position.

From the foregoing it will be apparent that the present invention has particular merits in connection with the machining of such articles as piston rings, wherein the depth of cut is low and the cutting time is short. While furthermore the piston rings are of such a small size that the tool slide must be retracted a substantial distance with respect to the cutting depth to permit the rings to be placed in and removed from the machine. Thus, in order to maintain a good rate of production, it is necessary for the carriage to advance extremely rapidly to a position close to the work and then move at reduced speed to an accurate final position, and then to retract at extremely high speed to its starting position. It is customary with such arrangements that the speed of the tool slide during its rapid advance and during its retraction will be as much as 600 times the speed of advance of the tool slide during the turning operation.

The arrangement according to the present invention is quite simple and relatively inexpensive, but can be adjusted accordingly with respect to the amount of retracting movement of the slide or slides and the point at which the tool commences its feed movement into the workpiece, and the point at which retraction of the tool from the workpiece is initiated.

It will be understood that this invention is susceptible to modification in order to adapt it to different usages and conditions, and accordingly, it is desired to comprehend such modifications within this invention as may fall within the scope of the appended claims.

We claim:
1. In a machine tool; a bed, a workpiece spindle rotatable on the bed, tool slide means reciprocable on the bed, hydraulic motor means operatively connected between the bed and slide means to actuate the slide means to move a tool carried by the slide means toward and away from a workpiece on said spindle, and mechanical means for controlling the speed of movement of said slide means on the bed during feeding of the tool into the workpiece for a cutting operation, said mechanical means comprising cooperating elements of abutment means occupying predetermined positions on said slide means and bed respectively and adapted for abutting interengagement at a predetermined point during the advancing movement of said slide means, the one of said elements on the bed being movable thereon to permit further advance of said slide means on the bed after said elements engage each other, drive means extending from said spindle to said one element drivingly connecting said spindle with said one element for causing movement of said one element on said bed to permit said slide to advance at feed rate under the bias of said hydraulic motor means after said elements engage each other, said drive means being normally ineffective, means responsive to interengagement of said elements for making said drive means effective, means responsive to a predetermined advancing movement of said slide means after said elements have interengaged for reversing the direction of movement of said slide means and for making said drive means ineffective, resilient means acting on said one element for returning said one element to a said predetermined position on said bed after said drive means has been made ineffective, said one element on the bed comprising a spiral cam and the said element on the slide means comprising a roller which engages the cam periphery at said predetermined point in the travel of said slide means.

2. A machine tool according to claim 1, in which said roller is supported on said slide means so as to move slightly toward said slide means upon engagement with said spiral cam and said means for making said drive means effective, comprising a limit switch operated by said movement of said roller on said slide means, and an electrically operated clutch controlled by said limit switch and operatively interposed between said spiral cam and said spindle.

3. A machine tool according to claim 2, in which said roller is spring urged away from said slide means and stop means is provided on said bed to engage and halt said slide means in its fully advanced position at the end of a workpiece cutting operation, whereby continued rotation of said cam will release said roller to its biasing spring so as to release said limit switch to release said clutch and disconnect said cam from said spindle, and means operable in response to said releasing of said limit switch for causing rapid retraction of said slide means.

4. A machine tool according to claim 3, in which said spiral cam is in the form of a spiral of Archimedes and is of such a pitch that said roller will not drive said cam.

5. A machine tool according to claim 4, in which said means for returning said one element to its predetermined position on said bed is a spring acting on said spiral cam to bias it back toward its starting position from the position into which it is rotated by said spindle, and stop means for stopping the cam in its starting position when returned thereto by said spring.

References Cited
UNITED STATES PATENTS

| | | | |
|---|---|---|---|
| 1,909,165 | 5/1933 | Burrell | 82—21 |
| 1,936,756 | 11/1933 | Flanders | 82—21 |
| 2,720,130 | 10/1955 | Chang | 82—21 |

LEONIDAS VLACHOS, *Primary Examiner.*